Shortt & Oberly,
Harvester Cutter.

No. 101,930.             Patented April 12, 1870.

Witnesses             Inventors.

UNITED STATES PATENT OFFICE.

E. G. SHORTT AND C. OBERLY, OF CARTHAGE, ASSIGNORS TO THEMSELVES AND E. B. SIMS, OF ANTWERP, NEW YORK.

IMPROVEMENT IN CUTTER-BARS FOR HARVESTERS.

Specification forming part of Letters Patent No. 101,930, dated April 12, 1870.

*To all whom it may concern:*

Be it known that we, E. G. SHORTT and C. OBERLY, of Carthage, in the county of Jefferson and in the State of New York, have invented certain new and useful Improvements in Harvester Cutter-Bars; and do hereby declare that the following is a full, clear, and exact description thereof, reference being had to the accompanying drawings, and to the letters of reference marked thereon, making a part of this specification.

The nature of our invention consists in providing each knife of a harvester cutter-bar with a cylindrical or an angular eye, formed at the extreme rear end of the said knife, and a projecting tongue to fit a V-shaped groove in the adjoining knife; also, with a feather projecting from the center to guide them and keep them in line on a bar made to receive them, where they may be held closely together by nuts upon the end of the said bar.

In order to enable others skilled in the art to which our invention appertains to make and use the same, we will proceed to describe its construction and operation, reference being had to the annexed drawings, in which—

Figure 1:
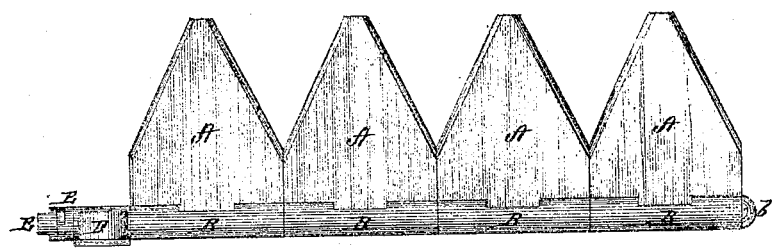
Figure 2:
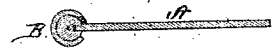
Figure 3:
Figure 4:

Figure 1 represents a plan view of the cutter-bar. Fig. 2 is a longitudinal vertical section of one of the knives. Fig. 3 is a vertical cross-section of two knives. Fig. 4 is a cross-section of the shaft or bar on which the knives are placed.

A A represent the knives, which are provided at their extreme rear ends with a cylindrical or angular eye, B, made of proper size to fit on the bar C. This bar C is provided with a groove running longitudinally the entire length of the same, and at one end said bar is provided with a knob or flange, *b*, so as to prevent the knives from slipping off.

Within the eye B of each knife is a lip, *a*, which fits in the groove on the bar C, so as to guide and keep the knives in line upon the bar.

The sides of the knives A A, where they join each other are provided one with a tongue and the other with a V-shaped groove of corresponding size, thus joining the knives closely, as seen in Fig. 3.

After the knives A A have been placed upon the bar C a collar, D, with suitable projections, is put on to form connection with the pitman, and the whole secured by nuts E E on the end of said bar, whereby the knives may be held closely together.

Having thus fully described our invention, what we claim as new, and desire to secure by Letters Patent, is—

1. The connecting edges of each knife of a cutter-bar, provided on the one side with a V-shaped tongue and on the other with a V-shaped groove, as and for the purpose set forth.

2. The combination of a grooved bar, C, with the knives A A, which have a lip to fit in the groove in said bar, substantially as and for the purpose set forth.

3. The combination of the grooved bar C with the knives as constructed, and with a nut for confining and tightening said knives upon the shaft, substantially as herein set forth.

In testimony that we claim the foregoing we have hereunto set our hands this 20th day of October, 1869.

E. G. SHORTT.
      C. OBERLY.

Witnesses:
 LEONARD G. PECK,
 F. JULIAN HAMMAND.